US009612625B2

(12) United States Patent
Oliver et al.

(10) Patent No.: US 9,612,625 B2
(45) Date of Patent: Apr. 4, 2017

(54) SYSTEM AND METHOD OF RENDERING DATA BASED ON AN ANGLE OF A CARRYING CASE FLAP

(71) Applicant: BLACKBERRY LIMITED, Waterloo (CA)

(72) Inventors: Robert George Oliver, Waterloo (CA); Nazih Almalki, Waterloo (CA); Andrew Martin Garber, Waterloo (CA)

(73) Assignee: BLACKBERRY LIMITED, Waterloo, Ontario (CA)

( * ) Notice: Subject to any disclaimer, the term of this patent is extended or adjusted under 35 U.S.C. 154(b) by 0 days.

(21) Appl. No.: 14/635,396

(22) Filed: Mar. 2, 2015

(65) Prior Publication Data
US 2016/0259378 A1    Sep. 8, 2016

(51) Int. Cl.
| | |
|---|---|
| *G06F 3/01* | (2006.01) |
| *G06F 1/16* | (2006.01) |
| *G09G 5/10* | (2006.01) |
| *H04M 1/02* | (2006.01) |
| *H04M 1/725* | (2006.01) |

(Continued)

(52) U.S. Cl.
CPC .......... *G06F 1/1677* (2013.01); *G06F 1/1694* (2013.01); *G06F 3/01* (2013.01); *G09G 5/006* (2013.01); *G09G 5/10* (2013.01); *G09G 5/38* (2013.01); *H04M 1/0216* (2013.01); *H04M 1/0243* (2013.01); *H04M 1/0245* (2013.01); *H04M 1/72575* (2013.01); *G09G 2320/0626* (2013.01); *G09G 2320/08* (2013.01); *G09G 2340/0492* (2013.01)

(58) Field of Classification Search
CPC .... G06F 1/1626; G06F 1/1616; G06F 1/1681; G06F 1/1637; G06F 2200/1634; G06F 2200/1614; G06F 1/162; H04M 1/0214; H04M 1/0216; H04M 1/0245; H04M 1/0227; H04M 1/0225
See application file for complete search history.

(56) References Cited

U.S. PATENT DOCUMENTS

| | | |
|---|---|---|
| 6,314,183 B1 | 11/2001 | Pehrsson et al. |
| 2009/0052123 A1 | 2/2009 | Takeya |
| 2013/0222323 A1 | 8/2013 | McKenzie |

(Continued)

OTHER PUBLICATIONS

European Search Report dated Aug. 2, 2016 for European Patent Application No. 16157796.0.

*Primary Examiner* — Jeffrey Chow
(74) *Attorney, Agent, or Firm* — Perry + Currier, Inc.

(57) ABSTRACT

A system and method of rendering data based on an angle of a carrying case flap is provided. The system comprises: a mobile device comprising: a processor and a display device; a carrying case configured to mate with the mobile device, the carrying case comprising a flap having an open position and a closed position, the flap at least partially obscuring the display device in the closed position when the mobile device is mated with the carrying case; and, a sensor located at one or more of the mobile device and the carrying case, the sensor configured to measure an angle between the flap and the display device as the flap moves between the closed position and the open position, the processor of the mobile device configured to: render data at the display device based on the angle.

18 Claims, 9 Drawing Sheets

(51) Int. Cl.
    *G09G 5/00*    (2006.01)
    *G09G 5/38*    (2006.01)

(56) References Cited

U.S. PATENT DOCUMENTS

| | | | |
|---|---|---|---|
| 2013/0328914 A1* | 12/2013 | Smith | G06F 3/01 |
| | | | 345/619 |
| 2014/0210803 A1 | 7/2014 | Oh et al. | |
| 2015/0026623 A1* | 1/2015 | Horne | G06F 3/04847 |
| | | | 715/771 |
| 2015/0031347 A1 | 1/2015 | Kim et al. | |
| 2015/0091882 A1* | 4/2015 | Dwarka | G06F 1/1626 |
| | | | 345/184 |
| 2015/0278529 A1* | 10/2015 | Cho | G06F 1/1677 |
| | | | 345/668 |

* cited by examiner

SYSTEM AND METHOD OF RENDERING DATA BASED ON AN ANGLE OF A CARRYING CASE FLAP

FIELD

The specification relates generally to mobile devices, and specifically to a system and method of rendering data based on an angle of a carrying case flap.

BACKGROUND

The evolution of computers is currently quite active in the mobile device environment. In particular, data rendered at display devices can be difficult to access when a flap of a carrying case mated with a mobile device is a closed or even partially open position.

BRIEF DESCRIPTIONS OF THE DRAWINGS

For a better understanding of the various implementations described herein and to show more clearly how they may be carried into effect, reference will now be made, by way of example only, to the accompanying drawings in which.

DETAILED DESCRIPTION

Figure 1:
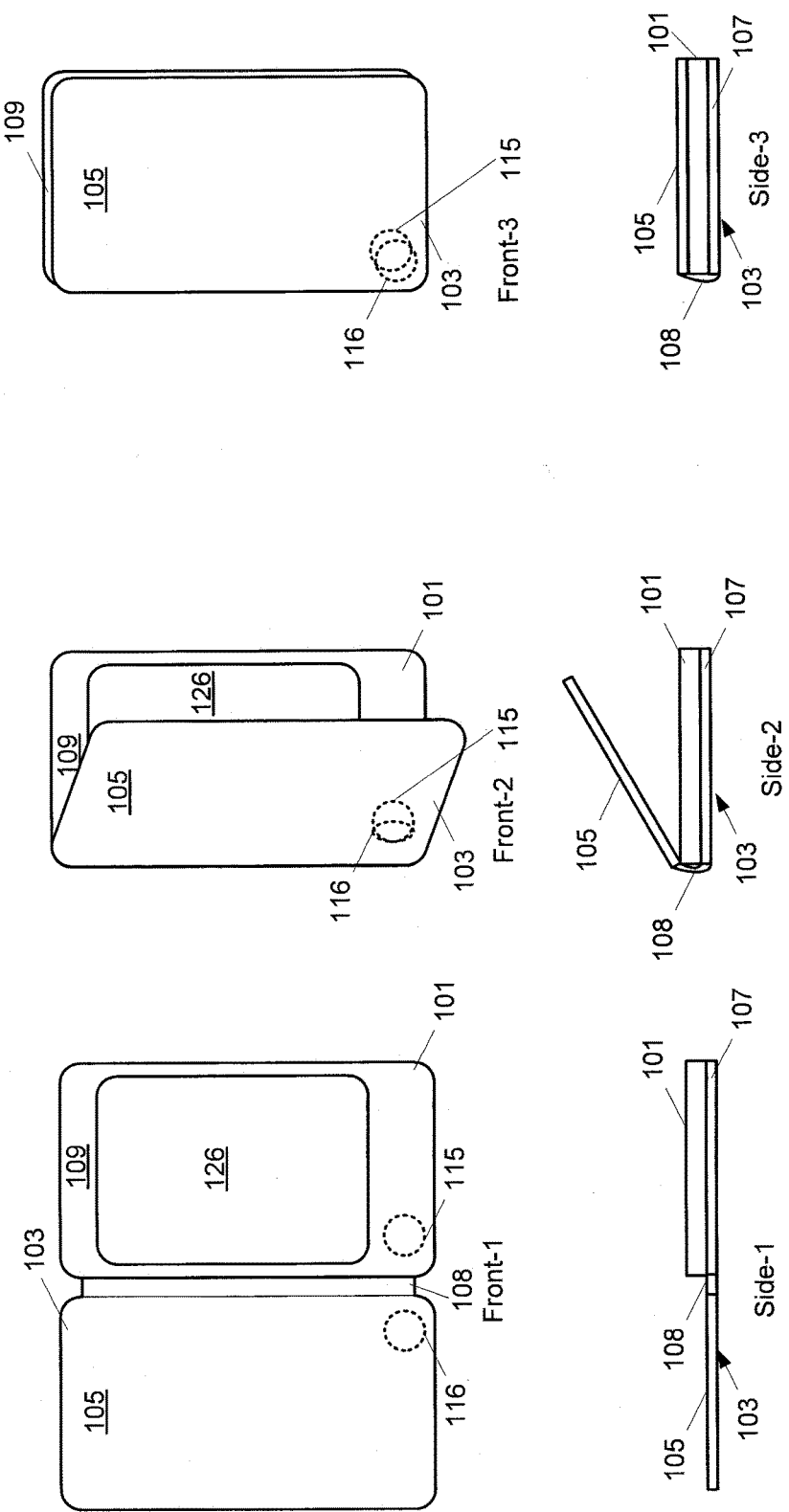
FIG. 1 depicts a sequence of views of a system configured to render data based on an angle of a carrying case flap, according to non-limiting implementations.

In general, this disclosure is directed to a system that includes a mobile device, a carrying case and a sensor for measuring an angle between a flap of the carrying case and the mobile device, the mobile device configured to render data at a display device based on the angle. For example, when the flap is partially opened, data can be rendered along an edge of the display device that is not obscured when the flap is partially opened and/or at an angle less than a threshold angle; when the flap is completely opened, and/or above the threshold angle, the data can be rendered at a different location and/or in a different orientation to take advantage of the a larger area of the display device not being obscured. Data rendered along the edge can include a time, messages, message icons, notifications, notification icons, application data and the like. The type of data rendered can be configured. Hence, in a meeting, and the like, a user can subtly peek at a time and/or missed messages and/or missed notifications by partially opening the flap to get a quick update without needing to turn on the entire phone or use both hands. Alternatively, in a dark environment, such as a presentation and/or movie theatre, a user can do a shallow peek at the display device to dimly show a quick update of time and notifications without attracting attention or bothering others; in some of these implementations, a brightness of the data rendered can also be controlled based on the angle. Similarly, in a crowded environment a user can use the flap as a privacy screen while reading messages and emails.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, ZZ, and the like). Similar logic can be applied for two or more items in any occurrence of "at least one . . . " and "one or more . . . " language.

An aspect of the present specification provides a system comprising: a mobile device comprising: a processor and a display device; a carrying case configured to mate with the mobile device, the carrying case comprising a flap having an open position and a closed position, the flap at least partially obscuring the display device in the closed position when the mobile device is mated with the carrying case; and, a sensor located at one or more of the mobile device and the carrying case, the sensor configured to measure an angle between the flap and the display device as the flap moves between the closed position and the open position, the processor of the mobile device configured to: render data at the display device based on the angle.

The flap can comprise a magnet and the sensor can comprise a magnetometer located at the mobile device.

The sensor can comprise one or more of a proximity sensor, a time-of-flight sensor, an infrared proximity sensor and an ultrasonic sensor located at one or more of the mobile device and the carrying case.

The sensor can comprise one or more of a flex sensor an accelerometer, and a gyrometer located at the carrying case, the carrying case can be configured to communicate the angle to the processor of the mobile device.

The processor can be further configured to render the data at the display device based on the angle by changing an orientation of the data rendered at the display device as the angle changes.

The processor can be further configured to render the data at the display device based on the angle by: rendering the data along a given edge of the display device when the angle is between about 0° and a threshold angle; and, rendering the data in a location of the display device different from the given edge when the angle is greater than the threshold angle.

The given edge can be opposite a flexible portion of the carrying case when the mobile device is mated with the carrying case.

The threshold angle can be between about 10° and about 45°.

The processor can be further configured to render the data at the display device based on the angle by changing a brightness of the display device as the angle changes.

The data can comprise one or more of: a current time, messages, message icons, notifications, notification icons, and application data.

Another aspect of the present specification provides method comprising: at a system comprising: a mobile device comprising: a processor and a display device; a carrying case configured to mate with the mobile device, the carrying case comprising a flap having an open position and a closed position, the flap at least partially obscuring the display device in the closed position when the mobile device is mated with the carrying case; and, a sensor located at one or more of the mobile device and the carrying case, the sensor configured to measure an angle between the flap and the display device as the flap moves between the closed position and the open position, measuring, at the sensor, the angle between the flap and the display device; receiving, at the processor, from the sensor, the angle; and, rendering, using the processor, data at the display device based on the angle.

The flap can comprise a magnet and the sensor can comprise a magnetometer located at the mobile device, and the method can further comprise measuring, at the sensor, the angle between the flap and the display device by the magnetometer measuring a magnetic field of the magnet.

The sensor can comprise one or more of a proximity sensor, a time-of-flight sensor, an infrared proximity sensor and an ultrasonic sensor located at one or more of the mobile device and the carrying case, and the method can further comprise measuring, at the sensor, the angle between the flap and the display device using one or more of the proximity sensor, the time-of-flight sensor, the infrared proximity sensor and the ultrasonic sensor.

The sensor can comprise one or more of a flex sensor an accelerometer, and a gyrometer located at the carrying case, and the carrying case can be configured to communicate the angle to the processor of the mobile device, the method can further comprise, transmitting, from the carrying case to the processor of the mobile device, the angle.

The method can further comprise rendering the data at the display device based on the angle by changing an orientation of the data rendered at the display device as the angle changes.

The method can further comprise rendering the data at the display device based on the angle by: rendering the data along a given edge of the display device when the angle is between about 0° and a threshold angle; and, rendering the data in a location of the display device different from the given edge when the angle is greater than the threshold angle.

The given edge can be opposite a flexible portion of the carrying case when the mobile device is mated with the carrying case.

The threshold angle can be between about 10° and about 45°.

The method can further comprise rendering the data at the display device based on the angle by changing a brightness of the display device as the angle changes.

Yet another aspect of the present specification provides a computer-readable medium storing a computer-executable program wherein execution of the computer-executable program is for: at a system comprising: a mobile device comprising: a processor and a display device; a carrying case configured to mate with the mobile device, the carrying case comprising a flap having an open position and a closed position, the flap at least partially obscuring the display device in the closed position when the mobile device is mated with the carrying case; and, a sensor located at one or more of the mobile device and the carrying case, the sensor configured to measure an angle between the flap and the display device as the flap moves between the closed position and the open position, measuring, at the sensor, the angle between the flap and the display device; receiving, at the processor, from the sensor, the angle; and, rendering, using the processor, data at the display device based on the angle. The computer-readable medium can comprise a tangible, non-transitory computer-readable medium.

Figure 2:
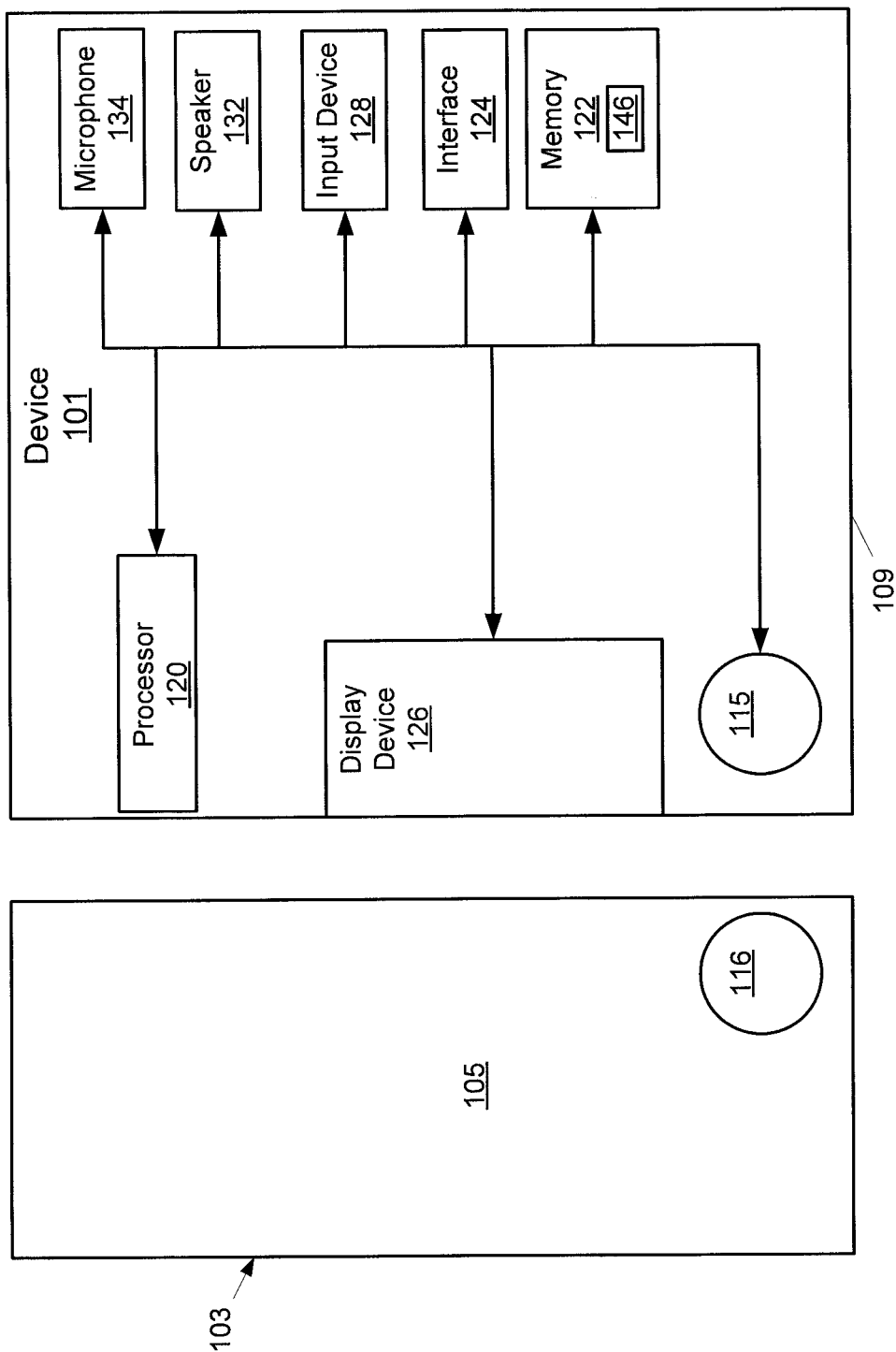
FIG. 2 depicts a schematic block diagram of the system of FIG. 1, according to non-limiting implementations.

Attention is next directed to FIG. 1 which depicts both front perspective views and side perspective views of a system 100, and FIG. 2, which depicts a schematic diagram of system 100, according to non-limiting implementations. System 100 comprises: a mobile device 101 comprising: a processor 120 and a display device 126; a carrying case 103 configured to mate with mobile device 101, carrying case 103 comprising a flap 105 having an open position and a closed position, flap 1-5 at least partially obscuring display device 126 in the closed position when mobile device 101 is mated with carrying case 103; and, a sensor 115 located at one or more of mobile device 101 and carrying case 103, sensor 115 configured to measure an angle between flap 105 and display device 126 as flap 105 moves between the closed position and the open position, processor 120 of mobile device 101 configured to: render data at display device 126 based on the angle. Mobile device 101 will be interchangeably referred to hereafter as device 101, and carrying case 103 will be interchangeably referred to hereafter as case 103.

In particular, in FIG. 1, views Front-1, Front-2, Front-3 depict a front perspective view of device 101 mated with case 103, and respective corresponding views Side-1, Side-2, Side-3 depict a side perspective view of device 101 mated with case 103 (e.g. along a longitudinal axis of device 101) as angle between flap 105 and display device 126 changes. For example, views Front-1, Front-2, Front-3 and respective corresponding views Side-1, Side-2, Side 3 depict device 101 mated with case 103, as flap 105 moves between an open position, in views Front-1 and Side-1, to a closed position in views Front-3 and Side-3. In views Front-2 and Side-2, flap 105 is in a partially open position between the closed position and the open position.

Furthermore, in the closed position, as depicted in view Front-3, flap 105 obscures and/or protects display device 126 and indeed flap 105 extends to a longitudinal edge of housing 109.

Hence, case 103 can comprise a flip-type carrying case in which flap 105 obscures display device 126 in the closed position. Hence, while not depicted, case 103 further comprises apparatus for mating with device including, but not limited to, clips, grips, a sleeve, a holster, a sheath, a receptacle and the like. In other words, case 103 is generally configured to removabley attach to device 101 to physically protect device 101.

Furthermore, as can be seen in FIG. 1, as depicted flap 105 is part of a front portion, and case 103 further comprises: a back portion 107, which is attached to a back of device 101 (i.e. a side opposite display device 126), as well as a flexible portion 108 joining flap 105 to back portion 107. As can be seen comparing views Side-1, Side-2, Side-3, as flap 105 moves from the open position, in view Side-1, to the closed position in view Side-3, flexible portion 108 bends, enabling flap 105 to close over display device 126.

Further, as depicted in FIGS. 1 and 2, sensor 115 can comprise a magnetometer and flap 105 can comprise a magnet 116 located such that a magnet field of magnet 116 is detectable by the magnetometer when device 101 is mated with case 103. Sensor 115 and magnet 116 are depicted in outline in FIG. 1 as these components can be located inside, respectively, device 101 and case 103. In any event, as flap 105 moves between the open position and the closed position, magnet 116 also moves, and a magnetic field of magnet 116 changes with respect to the magnetometer of sensor 115. As such, the magnetic field of magnet 116 at sensor 115 can be related to an angle between flap 105 and display device 126.

In other words, sensor 115 measures an angle between flap 105 and display device 126 by measuring the magnetic field of magnet 116. Sensor 115 can communicate the angle and/or data associated with the angle to processor 120 which can, in turn, render data at display device 126 based on the angle, as described hereafter.

Hence, the sensor measuring an angle, as described herein, can include measuring data associated with an angle, rather than measuring an absolute angle in angular units, as described in further detail below.

Device 101 can be any type of electronic device that can be used in a self-contained manner to communicate with one or more communication networks. Device 101 can include, but is not limited to, any suitable combination of mobile electronic devices, mobile communications devices, mobile computing devices, portable electronic devices, portable communications devices, portable computing devices, mobile telephones, portable telephones, PDAs (personal digital assistants), cellphones, smartphones, e-readers, and the like. Other suitable devices are within the scope of present implementations. For example, device 101 need not comprise a mobile communication device, but rather can comprise a device with specialized functions, for example a mobile camera device, a mobile telephone device, and the like.

It should be emphasized that the shape and structure of device 101 in FIGS. 1 and 2 are purely examples, and contemplate a device that can be used for both wireless voice (e.g. telephony) and wireless data communications (e.g. email, web browsing, text, and the like). However, FIG. 1 contemplates a device that can be used for any suitable specialized functions, including, but not limited to, one or more of, telephony, computing, camera, appliance, and/or entertainment related functions.

Device 101 generally comprises a housing 109, which can comprise any housing, casing, and the like, configured to be at least one of held and carried by a human hand. In general, housing 109 houses the components of device 101; however some components can be visible via apertures, windows and the like in housing 109. For example, display device 126 is generally visible.

With reference to FIG. 2, device 101 comprises at least one input device 128 generally configured to receive input data, and can comprise any suitable combination of input devices, including but not limited to a keyboard, a keypad, a pointing device (as depicted in FIG. 1), a mouse, a track wheel, a trackball, a touchpad, a touch screen (e.g. integrated with display device 126), and the like. Other suitable input devices are within the scope of present implementations.

Input from input device 128 is received at processor 120 (which can be implemented as a plurality of processors, including but not limited to one or more central processors ("CPUs")). Processor 120 can further comprise one or more hardware processors and/or digital signal processors ("DSP"). Processor 120 is configured to communicate with a memory 122 comprising a non-volatile storage unit (e.g. Erasable Electronic Programmable Read Only Memory ("EEPROM"), Flash Memory) and a volatile storage unit (e.g. random access memory ("RAM")). Programming instructions that implement the functional teachings of device 101 as described herein are typically maintained, persistently, in memory 122 and used by processor 120 which makes appropriate utilization of volatile storage during the execution of such programming instructions. Those skilled in the art will now recognize that memory 122 is an example of computer readable media that can store programming instructions executable on processor 120. Furthermore, memory 122 is also an example of a memory unit and/or memory module.

Memory 122 further stores an application 146 that, when processed by processor 120, enables processor 120 to: render data at display device 126 based on the angle between flap 105 and display device 126.

Furthermore, memory 122 storing application 146 is an example of a computer program product, comprising a non-transitory computer usable medium having a computer readable program code adapted to be executed to implement a method, for example a method stored in application 146.

Processor 120 is further configured to communicate with display device 126, which comprises any suitable one of, or combination of, flat panel displays (e.g. LCD (liquid crystal display), plasma displays, OLED (organic light emitting diode) displays, capacitive or resistive touchscreens, CRTs (cathode ray tubes) and the like. In particular, processor 120 is configured to control display device 126 to render data based on the angle between flap 105 and display device 126, as measured by sensor 115.

As depicted, device 101 further comprises an optional speaker 132 and an optional microphone 134. Speaker 132 comprises any suitable speaker for converting audio data to sound to provide one or more of audible alerts, audible communications from remote communication devices, and the like. Microphone 134 comprises any suitable microphone for receiving sound and converting to audio data. Speaker 132 and microphone 134 can be used in combination to implement telephone functions at device 101.

As depicted, processor 120 also connects to optional communication interface 124 (interchangeably referred to interchangeably as interface 124), which can be implemented as one or more radios and/or connectors and/or network adaptors, configured to wirelessly communicate with one or more communication networks (not depicted). It will be appreciated that interface 124 is configured to correspond with network architecture that is used to implement one or more communication links to the one or more communication networks, including but not limited to any suitable combination of USB (universal serial bus) cables, serial cables, wireless links, cell-phone links, cellular network links (including but not limited to 2G, 2.5G, 3G, 4G+ such as UMTS (Universal Mobile Telecommunications System), GSM (Global System for Mobile Communications), CDMA (Code division multiple access), FDD (frequency division duplexing), LTE (Long Term Evolution), TDD (time division duplexing), TDD-LTE (TDD-Long Term Evolution), TD-SCDMA (Time Division Synchronous Code Division Multiple Access) and the like, wireless data, Bluetooth links, NFC (near field communication) links, WLAN (wireless local area network) links, WiFi links, WiMax links, packet based links, the Internet, analog networks, the PSTN (public switched telephone network), access points, and the like, and/or a combination.

As depicted, sensor 115 comprises a magnetometer configured to measure a magnetic field of magnet 116, for example as magnet field changes when flap 105 moves between the open position and the closed position. Furthermore, while in FIG. 1, a particular location of sensor 115 (and magnet 116) is depicted, sensor 115 (and magnet 116) can be located at any suitable location where an angle between flap 105 and display device 126 can be measured. In other words, in these implementations, sensor 115 is calibrated such that a strength of the magnetic field is related to the angle.

In other implementations, sensor 115 can comprise one or more of a proximity sensor, a time-of-flight sensor, an infrared proximity sensor and an ultrasonic sensor such that an angle between flap 105 and display device 126 can be measured by measuring a proximity of flap 105 to sensor 115. In other words, in these implementations, sensor 115 is calibrated such that a proximity of flap 105 to sensor 115 is related to the angle. Furthermore, in these implementations, magnet 116 is optional.

In yet further implementations, sensor 115 can comprise a combination of a magnetometer and a proximity sensor (including, but not limited to, a time of flight sensor) such that an angle between flap 105 and display device 126 can be measured using both the magnetic field of magnet 116 and proximity of flap 105 to sensor 115.

It is further appreciated that sensor 115 need not measure an angle between flap 105 and display device 126 using absolute units. In other words, sensor 115 can measure a magnet field and/or a proximity using any scale and/or units, including, a digital scale of 0 to 255 arbitrary units. Indeed, the measurement need not be strictly related to an angle, but rather a processor 120 can be configured to render data at display device 126 based on the angle using threshold values based on whichever scale and/or units in use with sensor 115. For example, if a scale of 0 to 255 is used, and hence sensor 115 produces output to processor 120 ranging from 0 to 255, with 0 being representative of flap 105 being in the open position, and 255 being representative of flap 105 being in the closed position, thresholds between 0 and 255 can be used to render data at display device 126. In a non-limiting example, presuming a threshold value of "225" is representative of a threshold angle of about 20° between flap 105 and display device 126, such a threshold value can be stored at memory 122, and when output of sensor 115 is greater than or equal to "225", data at display device 126 can be rendered in a first configuration, and when output of sensor 115 is less than "225", data at display device 126 can be rendered in a second configuration. However, other threshold values and/or other threshold angles are within the scope of present implementations. For example, threshold angles can be between about 10° and about 45°.

While not depicted, device 101 further comprises a power supply, including, but not limited to, a battery, a power pack and the like, and/or a connection to a mains power supply and/or a power adaptor (e.g. and AC-to-DC (alternating current to direct current) adaptor). In general the power supply powers components of device 101.

Further, it should be understood that in general a wide variety of configurations for device 101 are contemplated.

Figure 3:
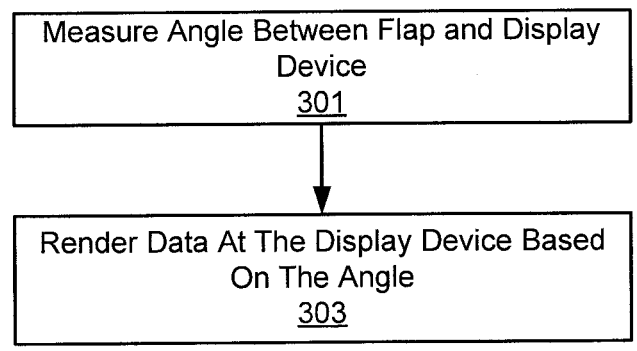
FIG. 3 depicts a block diagram of a flowchart of a method for rendering data based on an angle of a carrying case flap, according to non-limiting implementations.

Attention is now directed to FIG. 3 which depicts a block diagram of a flowchart of a method 300 for rendering data based on an angle of a carrying case flap, according to non-limiting implementations. In order to assist in the explanation of method 300, it will be assumed that method 300 is performed using device 101, and specifically by sensor 115 and processor 120, for example when processor 120 processes application 146. Indeed, method 300 is one way in which device 101 can be configured. Furthermore, the following discussion of method 300 will lead to a further understanding of device 101, and its various components. However, it is to be understood that device 101 and/or method 300 can be varied, and need not work exactly as discussed herein in conjunction with each other, and that such variations are within the scope of present implementations.

Regardless, it is to be emphasized, that method 300 need not be performed in the exact sequence as shown, unless otherwise indicated; and likewise various blocks may be performed in parallel rather than in sequence; hence the elements of method 300 are referred to herein as "blocks" rather than "steps". It is also to be understood, however, that method 300 can be implemented on variations of device 101 as well.

At block 301, sensor 115 measures an angle between flap 105 and display device 126 as flap 105 moves between the closed position and the open position. Flap 105 can be between closed position and the open position, but need not be at the open position or at the closed position.

At block 303, processor 120 renders data at display device 126 based on the angle, for example as based on output from sensor 115. It is assumed in block 303 that processor 120 receives data representative of the angle from sensor at block 301 and/or at block 303.

Method 300 is now described with reference to FIGS. 4 to 7, with FIGS. 4, 5 and 6 being substantially similar to FIG. 2 with like elements having like numbers, unless otherwise noted, and FIG. 7 being substantially similar to FIG. 2.

Figure 4:
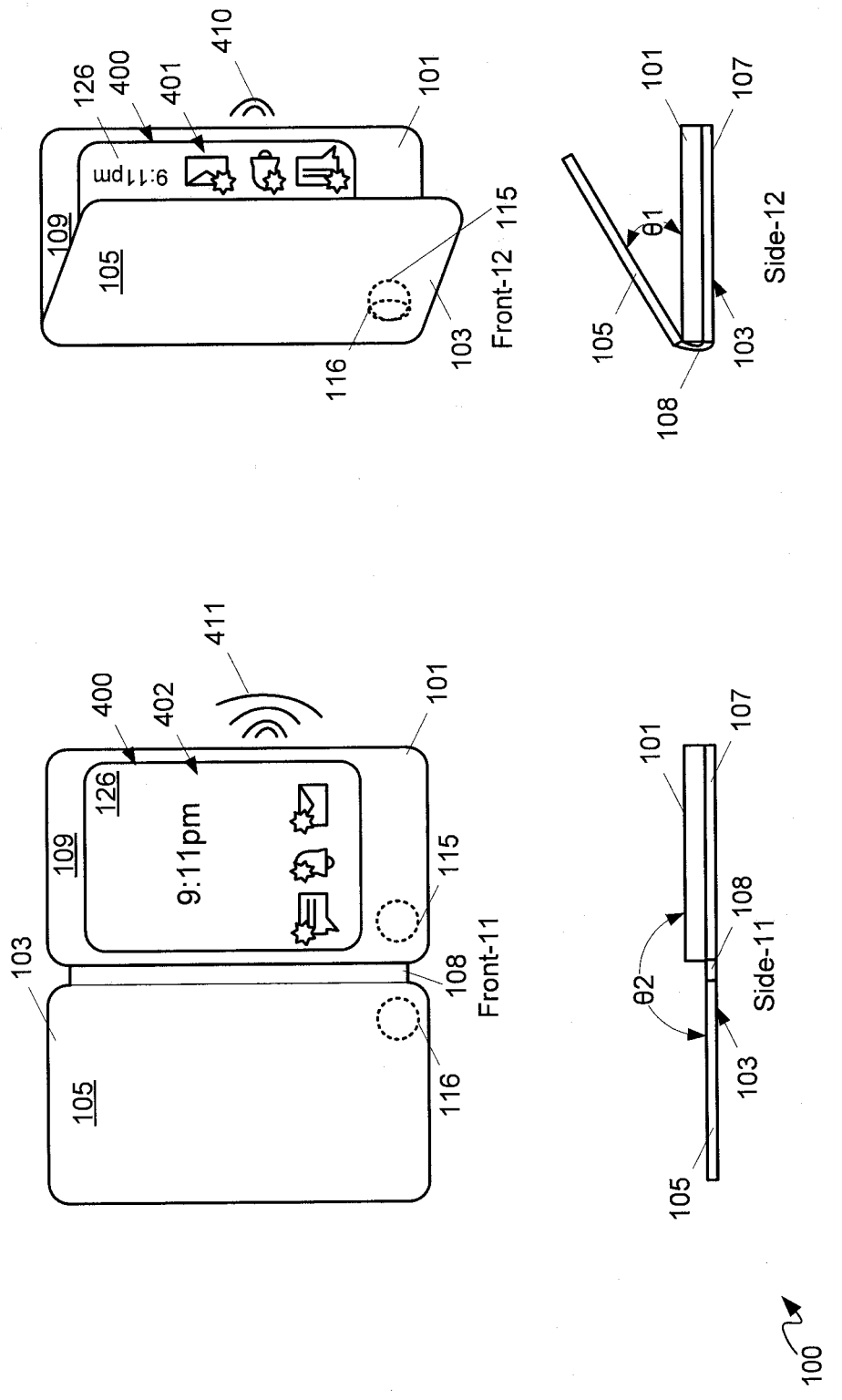
FIG. 4 depicts the system of FIG. 1 with data rendered at a display device based on the angle of the carrying case flap with the display device, according to non-limiting implementations.

Attention is hence next directed to FIG. 4, which is similar to FIG. 1, but with views Front-11, Front-12, and corresponding respective views Side-11, Side-12. Views Front-11, Front-12, Side-11 and Side-12 are respectively similar to views Front-1, Front-2, Side-1 and Side-2. However in view Front-12, data 401 is rendered along a given edge 400 of display device 126, when the angle between flap 105 and display device 126 is at angle θ1 (which corresponds to flap 105 being in a partially open position and less than a threshold angle), while in view Front-11, data 402 is rendered in a location of display device 126 different from given edge 400 when the angle between flap 105 and display device 126 is at angle θ2 (which corresponds to flap 105 being in the open position and/or greater than a threshold angle). View Side-12 shows flap 105 at angle θ1 with display device 126 (not visible in views Side-11, Side-12 but appreciated to be parallel to the depicted front surface of device 101 (which is facing "up" in views Side-11, Side-12, though the term "up" is understood to be relative to FIG. 4 only)). Similarly, view Side-11 shows flap 105 at angle θ2 with display device 126; in particular, angle θ2 can be about 180°.

In views Front-11, Front-12, it is shown that given edge 400 is opposite flexible portion 108 of carrying case 103 when mobile device 101 is mated with carrying case 103.

Furthermore, data 401 comprises icons corresponding to message icons and/or notification icons, as well as a current time, each of the message icons and/or notification icons indicating whether messages have been received and/or whether notifications are pending. While as depicted, data 402 is similar to data 401, in other implementations, data 402 can be different from data 401; for example, data 402 could include indications of network connectivity and/or network strength, application notifications and the like.

Comparing view Front-11, where flap 105 is at angle θ2 with display device 126, with view Front-12, where flap 105 is at angle θ1 with display device 126, and assuming that angle θ1 is between about 0° and a threshold angle (e.g. a threshold angle can be between about 10° and about 45°), it is apparent that processor 120 changes rendering of data 402, as compared to data 401 based on the angle between flap 105 and display device 126.

For example, processor 120 renders data 401, 402 at display device 126 based on the angle (i.e. at block 303) by changing an orientation of data 401, 402 rendered at display device 126. In particular, data 401 is in a landscape orientation (laid out parallel to a longitudinal axis of display device 126) while data 402 is in a portrait orientation (laid out perpendicular to the longitudinal axis of display device 126).

Furthermore, processor 120 renders data 401, 402 at display device 126 based on the angle (i.e. at block 303) by: rendering data 401 along given edge 400 of display device 126 when the angle is between about 0° and a threshold angle; and, rendering data in 402 a location of display device 126 different from given edge 400 when the angle is greater than the threshold angle. As described above, given edge 400 can be selected to be opposite flexible portion 108 of carrying case 103 when mobile device 101 is mated with carrying case 103. Hence, when flap 105 is opened to an angle below the threshold angle, a user can "peek" at data 401 to see the time, and/or updates to message icons and/or notification icons.

While not depicted, data 401 can transition to data 402 using any suitable process. For example, processor 120 can stop rendering data 401 when the angle between flap 105 and display device 126 is above a threshold angle, and render data 402, and/or processor 120 can animate a change from data 401 to data 402, and the like.

Also depicted in FIG. 4 is an alternative feature of present implementations: a brightness 410 of display device 126 in view Front-12, and a brightness 411 of display device 126 in view Front-11, where brightness 410 is less than brightness 411. Hence, as depicted, brightness 410, 411 of display device 126 can be optionally configured to change with the angle between flap 105 and display device 126. In particular, processor 120 can be further configured to render data 401, 402 at display device 126 based on the angle by changing a brightness of display device 126 as the angle changes. Indeed, brightnesses 410, 411 (and/or whether brightness changes at all) can be configured at device 101, for example using pull-down menus and the like. Hence, users can "peek" at data in a dark environment without distracting others around them, for example by controlling brightness 410 to be at lower level than brightness 411.

It is appreciated that while methods and processes described herein are with reference to flap 105 opening from a closed position and/or a partially open position, towards a fully open position, similar methods and processes occur, though in reverse, when flap 105 moves from a fully open position towards a closed position and/or a partially open position. In other words, data being rendered at display device 126 is not dependent on a direction of movement of flap 105, but whether flap 105 is above or below a threshold angle with display device 126.

Furthermore, while only one threshold angle is discussed, in other implementations data can be rendered at display device 126 based on more than threshold angle so that rendering of data at display device changes when each threshold angle is reached.

Figure 5:
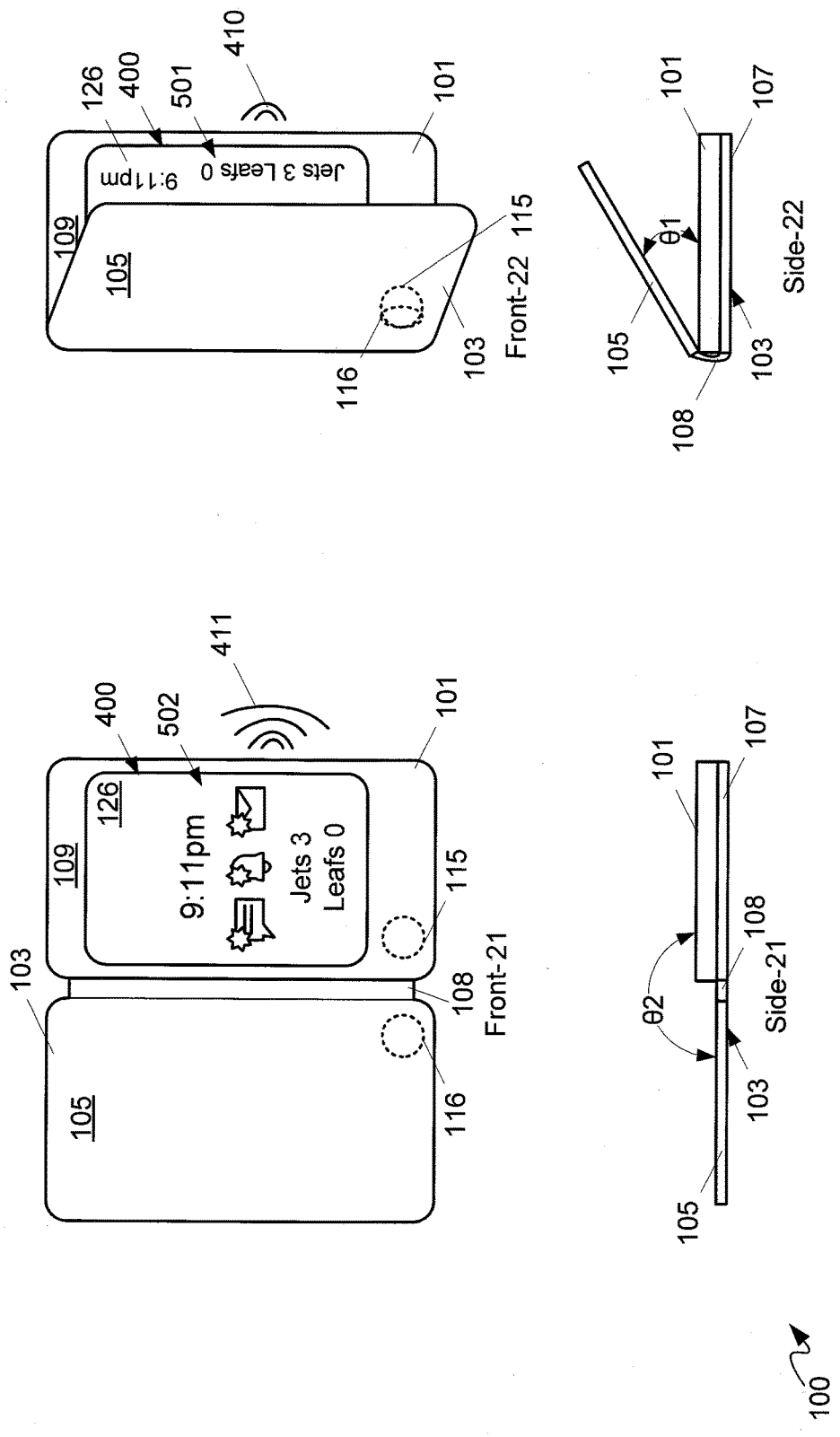
FIG. 5 depicts the system of FIG. 1 with data rendered at a display device based on the angle of the carrying case flap with the display device, according to alternative non-limiting implementations.
Figure 6:
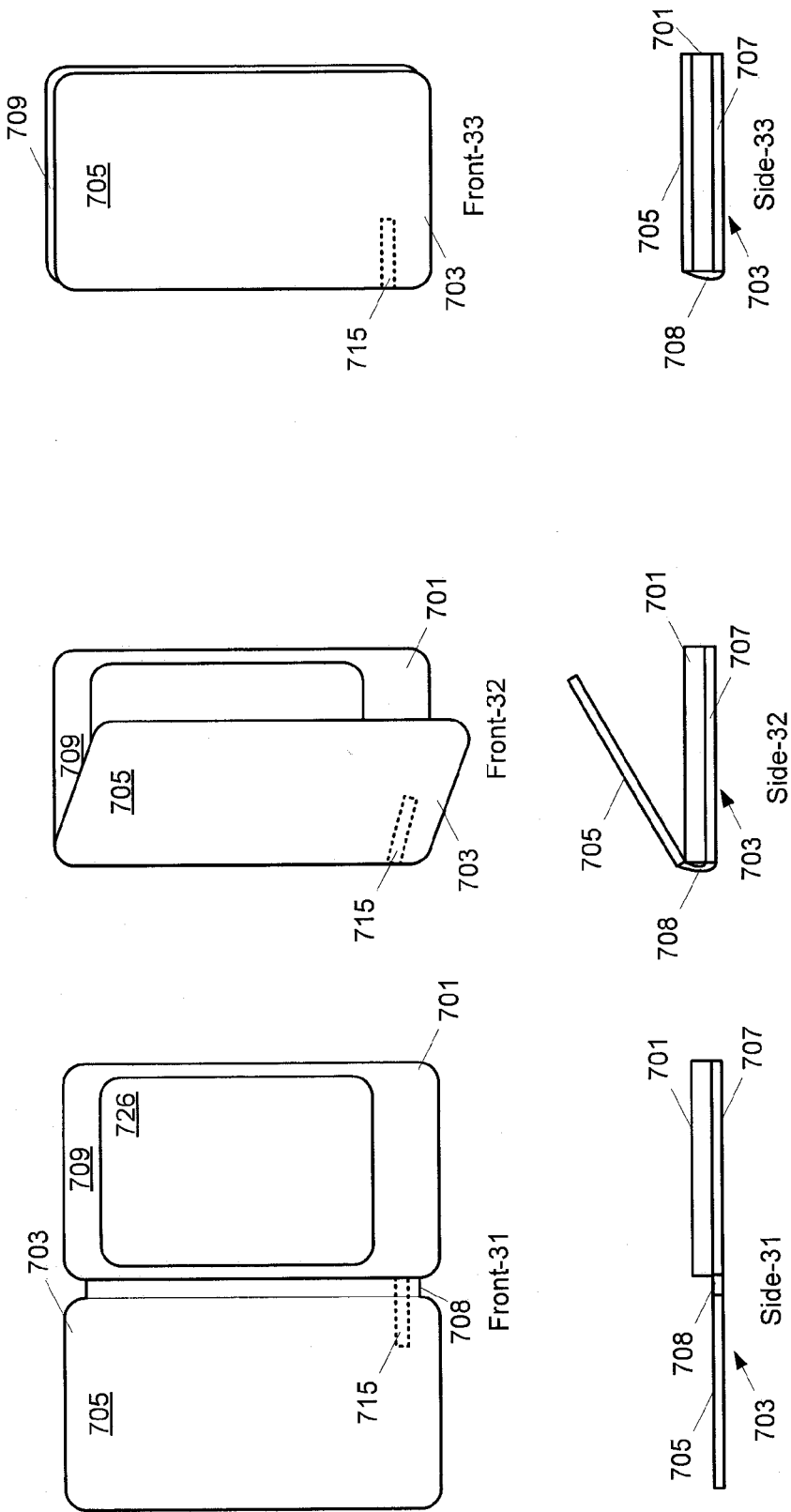
FIG. 6 depicts a sequence of views of a system configured to render data based on an angle of a carrying case flap, wherein a sensor is located at a carrying case, according to alternative non-limiting implementations.

Attention is next directed to FIG. 5 which depicts views Front-21, Front-22, and corresponding respective views Side-21, Side-22, each respectively similar to views Front-11, Front-12, Side-11 and Side-12. However, in FIG. 5, device 101 has been configured to provide application data along given edge 400. In other words, in some implementations, the data that is rendered when the angle between flap 105 and display device 126 is less than a threshold angle (as in view Front-22) can be configured, for example using pull-down menus and the like. As depicted, device 101 has been configured to render application data 501 at display device 126 in view Front-22, and in particular sport scores as well as a current time, while in view Front-21, data 502 is similar to data 402 but with the application data added. FIG. 5 hence further illustrates that data 501 rendered when the angle between flap 105 and display device 126 is less than a threshold angle can be different from data 502 rendered when the angle between flap 105 and display device 126 is greater than the threshold angle.

Persons skilled in the art will appreciate that there are yet more alternative implementations and modifications possible, and that the above examples are only illustrations of one or more implementations. For example, attention is next directed to FIGS. 6 and 7, which are substantially similar to, respectively, FIGS. 1 and 2 with like elements having like numbers, however in a "700" series rather than a "100" series. Hence, FIGS. 6 and 7 depict system 700 comprising: a mobile device 701 comprising: a processor 720 and a display device 726; a carrying case 703 configured to mate with mobile device 701, carrying case 703 comprising a flap 705 having an open position and a closed position, flap 805 at least partially obscuring display device 726 in the closed position when mobile device 701 is mated with carrying case 703; and, a sensor 715 located at one or more of mobile device 701 and carrying case 703, sensor 715 configured to measure an angle between flap 705 and display device 726 as flap 705 moves between the closed position and the open position, processor 720 of mobile device 701 configured to: render data at display device 726 based on the angle. Mobile device 701 will be interchangeably referred to hereafter as device 701, and carrying case 703 will be interchangeably referred to hereafter as case 703. Furthermore, with reference to FIG. 6, carrying case 703 further comprises a back portion 707 and a flexible portion and, with reference to FIG. 7, device 701 further comprises: a housing 709, a memory 722 storing an application 746, a communication interface 724, an input device 728, a speaker 732 and a microphone 734. Furthermore, Views Front-31, Front-32, Front-33, Side-31, Side-32, and Side-33 are respectively similar to views Front-1, Front-2, Front-3, Side-1, Side-2 and Side-3.

However, in contrast to system 100, sensor 715 comprises a flex sensor located at carrying case 703, and carrying case 703 configured to communicate the angle to 720 processor of mobile device 701. For example, sensor 715 comprises a flex sensor that is in contact and/or communication with and/or coupled to flexible portion 708 so that as flexible portion 708 changes configuration (i.e. as an angle between flap 705 and display device 726 changes), the flex sensor can measure (e.g. at block 301 of method 300) the angle between flap 705 and display device 726 (i.e. by measuring an amount of flex of flexible portion 708).

Figure 7:
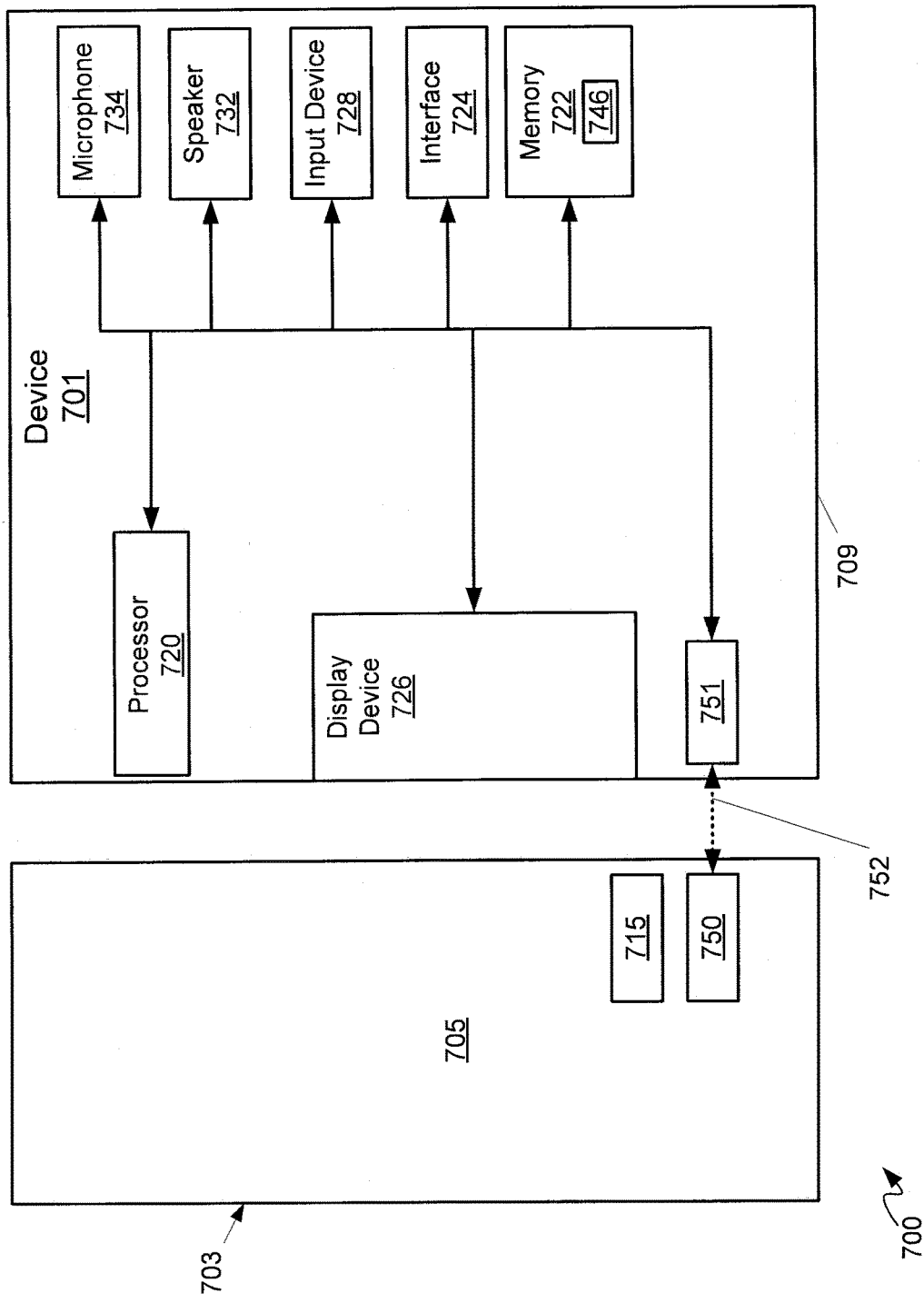
FIG. 7 depicts a schematic block diagram of the system of FIG. 1, according to non-limiting implementations.

As such, and with reference to FIG. 7, case 703 can further comprise a communication interface 750, in communication with sensor 715, and device 701 can comprise a communication interface 750, interfaces 750, 751 configured to communicate with each other, and/or interface 751 is configured to receive flex sensor data from interface 750, for example via a wired and/or wireless link 752 there between. For example, each of interfaces 750, 751 can comprise wireless interfaces (including, but not limited to, near field communication (NFC) interfaces) and/or each of interfaces 750, 751 can comprise wired interfaces (including, but not limited to, USB (universal serial bus) interfaces). Either way, interfaces 750, 751 are positioned and/or generally configured to communicate with each other. Interface 750 receives flex sensor data from sensor 715 indicative an angle between flap 705 and display device 726, and transmits the flex sensor data to interfaces 751, where it is received at processor 720, which renders data at display device 726 based on the angle (e.g. at block 303 of method 300).

While not depicted, carrying case 703 can comprise a power source, such as a battery and the like, to power interface 750; however, in other implementations, power can be received (wirelessly and/or via wired connections), from interface 751.

In yet further implementations, device 701 and carrying case 703 can be adapted for other sensor technologies. For example, carrying case 703 can comprise a magnetometer and device 701 can comprise a magnet, similar to device 101 and case 103 but with the locations of the magnetometer and magnet reversed.

Furthermore, rather than a flex sensor, carrying case 703 could comprise one or more of an accelerometer and a gyrometer, each configured to measure an angle between flap 705 and display device 726 based on a calibrated movement of flap 705 with respect to display device 726.

Regardless of a technology used for sensor 715, case 703 can communicate data corresponding to a measured angle to device 701 using interface 750 communicating with interface 751.

Figure 8:
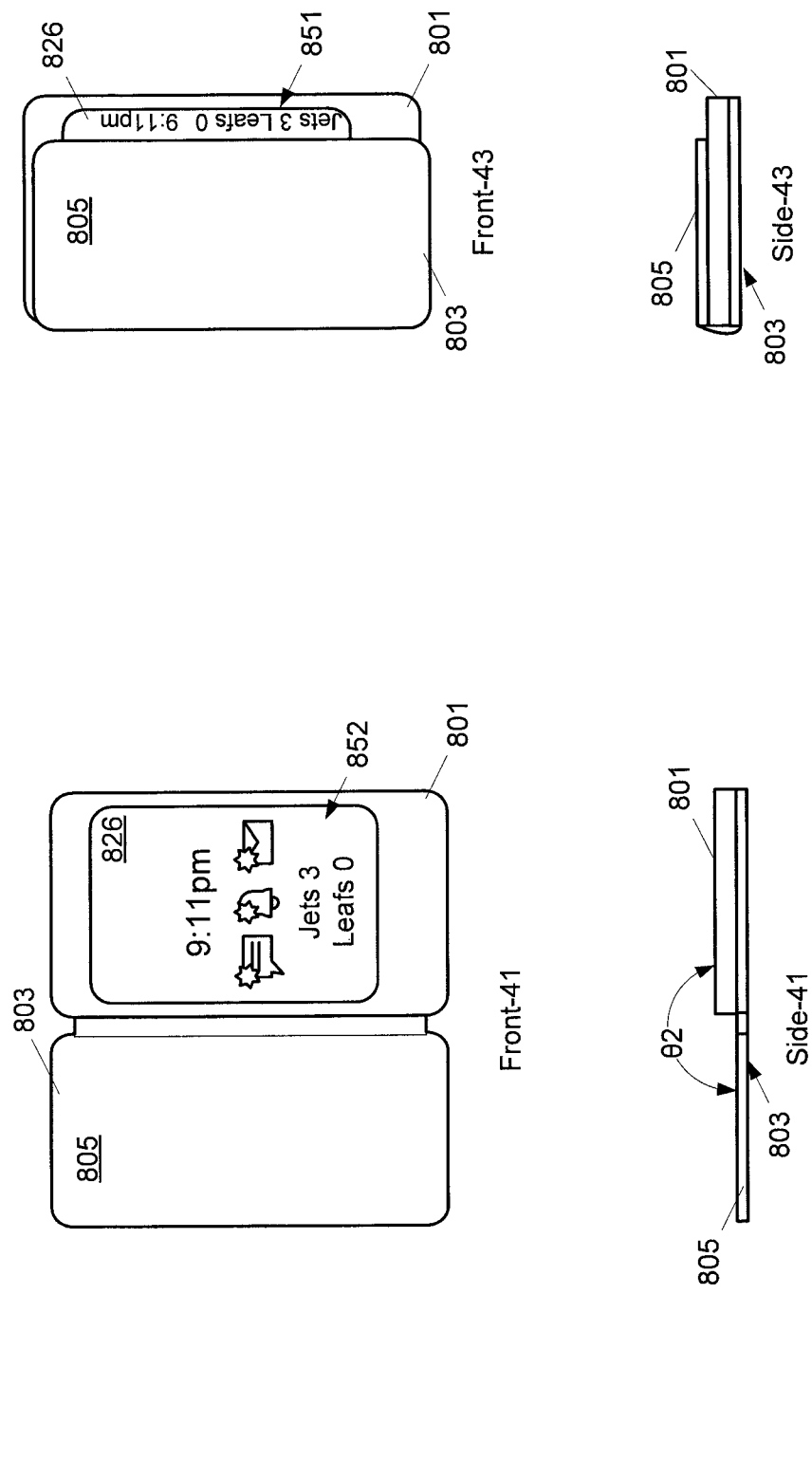
FIG. 8 depicts a sequence of views of a system configured to render data based on an angle of a carrying case flap, wherein a flap of the carrying case partially obscures a display device in the closed position, according to alternative non-limiting implementations.

Other configurations of carrying cases and corresponding flaps are within the scope of present implementations. For example, attention is next directed to FIG. 8 which is substantially similar to FIG. 1 with like elements having like numbers, however in an "800" series rather than a "100" series. Hence, FIG. 8 depicts system 800 comprising: a mobile device 801 comprising: a processor (not shown but assumed to present) and a display device 826; a carrying case 803 configured to mate with mobile device 801, carrying case 803 comprising a flap 805 having an open position and a closed position, flap 805 at least partially obscuring display device 826 in the closed position when mobile device 801 is mated with carrying case 803; and, a sensor (not shown but assumed to present) located at one or more of mobile device 801 and carrying case 803, the sensor configured to measure an angle between flap 805 and display device 826 as flap 805 moves between the closed position and the open position, the processor of mobile device 801 configured to: render data at display device 826 based on the angle. Mobile device 801 will be interchangeably referred to hereafter as device 801, and carrying case 803 will be interchangeably referred to hereafter as case 803. Furthermore, while the sensor and the processor are not depicted, and other elements of device 801 and case 803 are either not depicted and/or not numbered, it is assumed that such elements, including the sensor and the processor, are nonetheless present. Furthermore, any of the previous sensor technologies can be present.

In addition, FIG. 8 depicts views Front-41, Front-43, Side-41, Side-43 which are respectfully similar to views Front-1, Front-3, Side-1, Side-3 of FIG. 1. Hence, views Front-41, Side-41 depict flap 805 in an open position and views Front-43, Side-43 depict flap 805 in a closed position.

In any event, in contrast to flap 105, flap 805 only partially obscures display device 826 does not extend to an edge of display device 126; rather at least a portion of display device 826 is exposed and/or not obscured and/or visible when flap 805 is in the closed position. In these implementations, the processor of device 801 renders data 851 (e.g. similar to data 401 and/or 501) at display device 826 in the portion that is not obscured by flap 805, when an angle between flap 805 and display device 826 is about 0°, renders data 852 (e.g. similar to data 402 and/or 502) at display device 826 in a different location of display device 826, when an angle between flap 805 and display device 826 is at angle θ2 that is greater than a threshold angle, as described above. Hence, when flap 805 is in the closed position, data 851 is available to be peeked at by a user. A brightness of display device 826 can also be lower in view Front-43, as compared to view Front-41, as described above.

Figure 9:
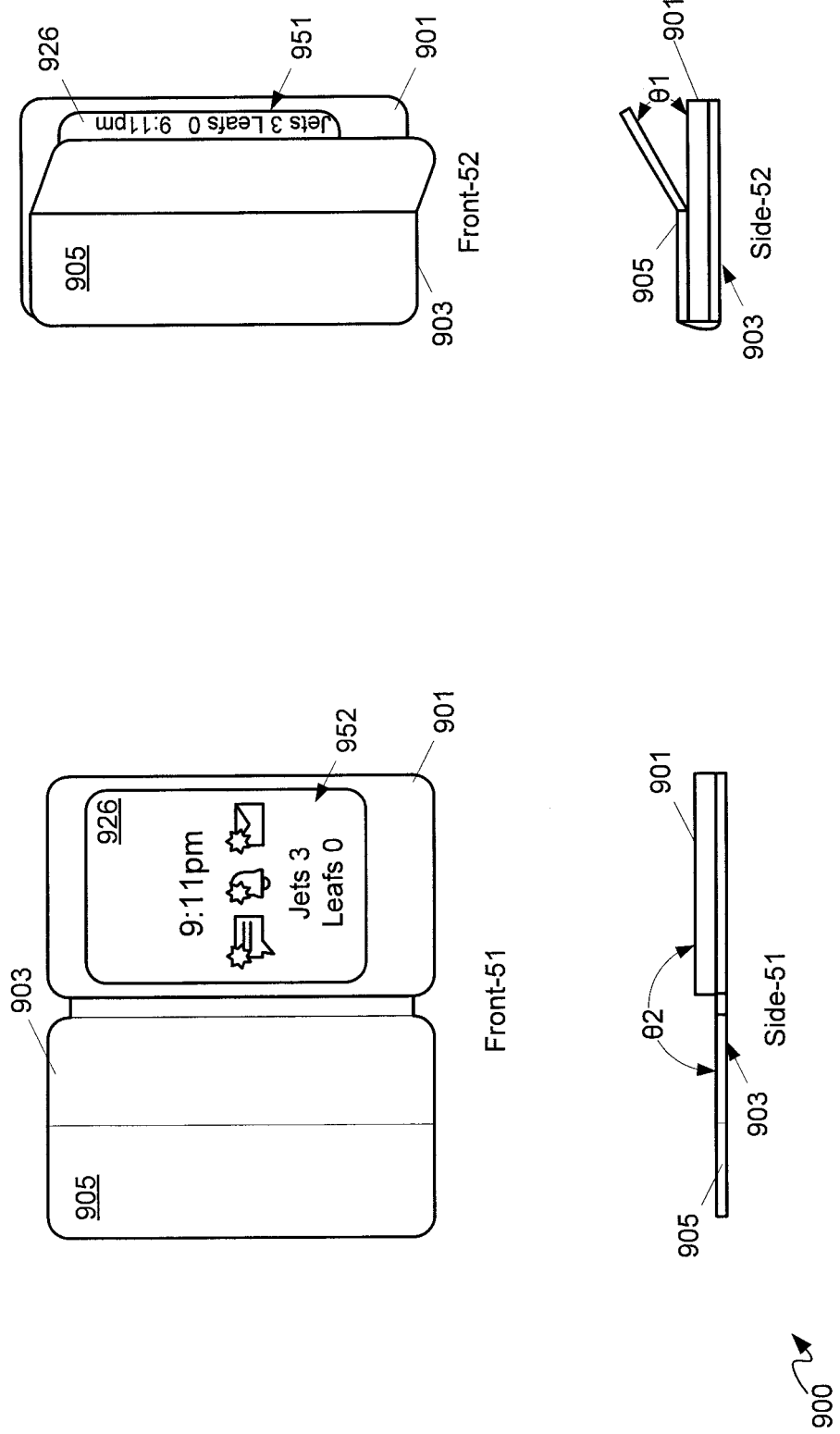
FIG. 9 depicts a sequence of views of a system configured to render data based on an angle of a carrying case flap, wherein a portion flap is foldable, according to alternative non-limiting implementations.

Other configurations of carrying cases and corresponding flaps are within the scope of present implementations. For example, attention is next directed to FIG. 9 which is substantially similar to FIG. 1 with like elements having like numbers, however in an "900" series rather than a "100" series. Hence, FIG. 9 depicts system 900 comprising: a mobile device 901 comprising: a processor (not shown but assumed to present) and a display device 926; a carrying case 903 configured to mate with mobile device 901, carrying case 903 comprising a flap 905 having an open position and a closed position, flap 905 at least partially obscuring display device 926 in the closed position when mobile device 901 is mated with carrying case 903; and, a sensor (not shown but assumed to present) located at one or more of mobile device 901 and carrying case 903, the sensor configured to measure an angle between flap 905 and display device 926 as flap 905 moves between the closed position and the open position, the processor of mobile device 901 configured to: render data at display device 926 based on the angle. Mobile device 901 will be interchangeably referred to hereafter as device 901, and carrying case 903 will be interchangeably referred to hereafter as case 903. Furthermore, while the sensor and the processor are not depicted, and other elements of device 901 and case 903 are either not depicted and/or not numbered, it is assumed that such elements, including the sensor and the processor, are nonetheless present. Furthermore, any of the previous sensor technologies can be present.

In addition, FIG. 9 depicts views Front-51, Front-52, Side-51, Side-52 which are respectfully similar to views Front-1, Front-3, Side-1, Side-3 of FIG. 1. Hence, views Front-51, Side-51 depict flap 905 in an open position and views Front-52, Side-52 depict flap 905 in a partially open position.

In any event, in contrast to flap 105, flap 905 is foldable, for example in half, such that a first portion of flap 905 can be lifted from display device 926 while a second portion remains located adjacent display device 926, as best seen in views Front-52, Side-52. In these implementations, the processor of device 901 renders data 951 (e.g. similar to data 401 and/or 501) at display device 926 in the portion that is not obscured by flap 905, when an angle θ1 between a portion of flap 905 and display device 926 is less than a threshold angle 0°, and renders data 952 (e.g. similar to data 402 and/or 502) at display device 926 in a different location of display device 926, when an angle between flap 905 and display device 926 is at angle θ2 that is greater than a threshold angle, as described above. Hence, when flap 905 is in the closed position, data 951 is available to be peeked at by a user by lifting the portion of flap 905 that is closest to an edge where data 951 can be rendered. A brightness of display device 926 can also be lower in view Front-52, as compared to view Front-51, as described above.

It is further assumed in system 900 that respective a sensor, magnet (if present) and the like are located to measure an angle between that portion of flap 905 that folds and display device 926 as the portion of flap 905 moves between the closed position and at least the partially open position depicted in views Front-52, Side-52.

While flap 905 as depicted as folding in about half along a longitudinal axis, in other implementations of carrying cases described herein, respective flaps could fold in different ways, for example, a portion could fold diagonally (e.g. from a corner) with respect to a longitudinal axis. Furthermore, such flap portions can be configured to fold in more than one way, for example both longitudinally and diagonally, with sensors etc., located to determine which portions are folding and angles between respective portions and a display device. A processor of a device mated with such a carrying case can be configured to render data at the display device based on: which portion of a flap is being folded and an angle between a respective flap portion and the display device. Hence, folding a first flap portion diagonally could cause the processor to render first data at respective portion of the display device that is not obscured by the first flap portion when partially open, and folding a second flap portion longitudinally could cause the processor to render second data at respective portion of the display device that is not obscured by the second flap portion when partially open (e.g. when each flap portion meets threshold angle conditions). The data rendered could be different: for example, in non-limiting implementations, folding from a corner could cause the processor to render time in a respective portion of the display device, and folding from an edge could cause the processor to render notifications a respective portion of the display device, and the like.

Provided herein are systems and method of rendering data at a display device of a mobile device based on an angle between a flap of a carrying case and the display device, so that a user can "peek" at data at the display device by lifting the flap to an angle that is less than a threshold angle. The data is rendered at display device at an area of display device that enables the data to be seen by the user when the flap is below the threshold angle. The brightness of display device can also be controlled base on the angle, as well as the type of data rendered.

Those skilled in the art will appreciate that in some implementations, the functionality of devices 101, 701, and carrying case 703 can be implemented using pre-programmed hardware or firmware elements (e.g., application specific integrated circuits (ASICs), electrically erasable programmable read-only memories (EEPROMs), etc.), or other related components. In other implementations, the functionality of devices 101, 701, and carrying case 703 can be achieved using a computing apparatus that has access to a code memory (not depicted) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, the computer-readable program code can be stored as a computer program product comprising a computer usable medium. Further, a persistent storage device can comprise the computer readable program code. The computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. A system comprising:
    a mobile device comprising: a processor and a display device;
    a carrying case configured to mate with the mobile device, the carrying case comprising a flap having an open position and a closed position, the flap at least partially obscuring the display device in the closed position when the mobile device is mated with the carrying case; and,
    a sensor located at one or more of the mobile device and the carrying case, the sensor configured to measure an angle between the flap and the display device as the flap moves between the closed position and the open position,
    the processor of the mobile device configured to:
        render data at the display device based on the angle by: rendering first data along a given edge of the display device in a first orientation, when the angle is between about 0° and a threshold angle; and, rendering second data in a location of the display device different from the given edge and in a second orientation 90° from the first orientation, when the angle is greater than the threshold angle, the first data comprising configurable application data, and the second data comprising the configurable application data and additional data.

2. The system of claim 1, wherein the flap comprises a magnet and the sensor comprises a magnetometer located at the mobile device.

3. The system of claim 1, wherein the sensor comprises one or more of a proximity sensor, a time-of-flight sensor, an infrared proximity sensor and an ultrasonic sensor located at one or more of the mobile device and the carrying case.

4. The system of claim 1, wherein the sensor comprises one or more of a flex sensor an accelerometer, and a gyrometer located at the carrying case, the carrying case configured to communicate the angle to the processor of the mobile device.

5. The system of claim 1, wherein the given edge is opposite a flexible portion of the carrying case when the mobile device is mated with the carrying case.

6. The system of claim 1, wherein the threshold angle is between about 10° and about 45°.

7. The system of claim 1, wherein the processor is further configured to render the data at the display device based on the angle by changing a brightness of the display device as the angle changes.

8. The system of claim 1, wherein the configurable application data is configurable using a menu rendered at the display device.

9. A method comprising:
at a system comprising: a mobile device comprising: a processor and a display device; a carrying case configured to mate with the mobile device, the carrying case comprising a flap having an open position and a closed position, the flap at least partially obscuring the display device in the closed position when the mobile device is mated with the carrying case; and, a sensor located at one or more of the mobile device and the carrying case, the sensor configured to measure an angle between the flap and the display device as the flap moves between the closed position and the open position,
measuring, at the sensor, the angle between the flap and the display device;
receiving, at the processor, from the sensor, the angle; and,
rendering, using the processor, data at the display device based on the angle by: rendering first data along a given edge of the display device in a first orientation, when the angle is between about 0° and a threshold angle; and, rendering second data in a location of the display device different from the given edge and in a second orientation 90° from the first orientation, when the angle is greater than the threshold angle, the first data comprising configurable application data, and the second data comprising the configurable application data and additional data.

10. The method of claim 9, wherein the flap comprises a magnet and the sensor comprises a magnetometer located at the mobile device, the method further comprising measuring, at the sensor, the angle between the flap and the display device by the magnetometer measuring a magnetic field of the magnet.

11. The method of claim 9, wherein the sensor comprises one or more of a proximity sensor, a time-of-flight sensor, an infrared proximity sensor and an ultrasonic sensor located at one or more of the mobile device and the carrying case, the method further comprising measuring, at the sensor, the angle between the flap and the display device using one or more of the proximity sensor, the time-of-flight sensor, the infrared proximity sensor and the ultrasonic sensor.

12. The method of claim 9, wherein the sensor comprises one or more of a flex sensor an accelerometer, and a gyrometer located at the carrying case, the carrying case configured to communicate the angle to the processor of the mobile device, the method further comprising, transmitting, from the carrying case to the processor of the mobile device, the angle.

13. The method of claim 9, wherein the given edge is opposite a flexible portion of the carrying case when the mobile device is mated with the carrying case.

14. The method of claim 9, wherein the threshold angle is between about 10° and about 45°.

15. The method of claim 9, further comprising rendering the data at the display device based on the angle by changing a brightness of the display device as the angle changes.

16. The method of claim 9, wherein the configurable application data is configurable using a menu rendered at the display device.

17. A non-transitory computer-readable medium storing a computer program wherein execution of the computer-executable computer program is for:
at a system comprising: a mobile device comprising: a processor and a display device; a carrying case configured to mate with the mobile device, the carrying case comprising a flap having an open position and a closed position, the flap at least partially obscuring the display device in the closed position when the mobile device is mated with the carrying case; and, a sensor located at one or more of the mobile device and the carrying case, the sensor configured to measure an angle between the flap and the display device as the flap moves between the closed position and the open position,
measuring, at the sensor, the angle between the flap and the display device;
receiving, at the processor, from the sensor, the angle; and,
rendering, using the processor, data at the display device based on the angle by: rendering first data along a given edge of the display device in a first orientation, when the angle is between about 0° and a threshold angle; and, rendering second data in a location of the display device different from the given edge and in a second orientation about 90° from the first orientation, when the angle is greater than the threshold angle, the first data comprising configurable application data, and the second data comprising the configurable application data and additional data.

18. The non-transitory computer-readable medium of claim 17, wherein the configurable application data is configurable using a menu rendered at the display device.

* * * * *